(12) United States Patent
Gunderson

(10) Patent No.: US 7,467,813 B2
(45) Date of Patent: Dec. 23, 2008

(54) QUICK CONNECTOR

(75) Inventor: Stephen H. Gunderson, Marine City, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 365 days.

(21) Appl. No.: 11/174,262

(22) Filed: Jun. 30, 2005

(65) Prior Publication Data

US 2005/0258646 A1    Nov. 24, 2005

Related U.S. Application Data

(63) Continuation-in-part of application No. 11/039,541, filed on Jan. 19, 2005, now Pat. No. 7,344,166, which is a continuation-in-part of application No. 10/774,290, filed on Feb. 5, 2004, now abandoned.

(51) Int. Cl.
    *F16L 37/00* (2006.01)
(52) U.S. Cl. .................................. 285/319; 285/305
(58) Field of Classification Search .............. 285/305, 285/319
    See application file for complete search history.

(56) References Cited

U.S. PATENT DOCUMENTS

| | | | |
|---|---|---|---|
| 4,936,544 A | 6/1990 | Bartholomew | |
| 4,943,091 A * | 7/1990 | Bartholomew | 285/12 |
| 4,948,176 A | 8/1990 | Bartholomew | |
| 5,109,888 A | 5/1992 | Usui | |
| 5,152,555 A | 10/1992 | Szabo | |
| 5,161,832 A | 11/1992 | McNaughton et al. | |
| 5,257,833 A | 11/1993 | McNaughton et al. | |
| 5,324,082 A | 6/1994 | McNaughton et al. | |
| 5,395,140 A | 3/1995 | Wiethorn | |
| 5,626,371 A | 5/1997 | Bartholomew | |
| 5,931,509 A | 8/1999 | Bartholomew | |
| 6,086,118 A | 7/2000 | McNaughton et al. | |
| 6,173,994 B1 | 1/2001 | Ketcham | |
| 6,173,998 B1 * | 1/2001 | Bock | 285/319 |
| 6,279,966 B1 | 8/2001 | Kondo et al. | |
| 6,343,814 B1 * | 2/2002 | Bucher et al. | 285/319 |
| 6,402,204 B1 | 6/2002 | Stuart et al. | |
| 6,499,771 B1 | 12/2002 | Snyder, Sr. et al. | |
| 6,517,115 B1 | 2/2003 | Blivet | |
| 6,517,118 B2 | 2/2003 | Kato et al. | |
| 6,616,195 B2 | 9/2003 | Imaeda et al. | |
| 6,679,528 B1 | 1/2004 | Poder | |

FOREIGN PATENT DOCUMENTS

EP    1 099 897 A1    5/2001

* cited by examiner

*Primary Examiner*—Aaron M Dunwoody
*Assistant Examiner*—Fannie Kee
(74) *Attorney, Agent, or Firm*—Leydig, Voit & Mayer, Ltd.

(57) ABSTRACT

A fluid coupling assembly comprising a connector body defining a bore extending axially forward from an entrance opening, a tubular male member with an upset, a seal member, and a retainer. The retainer is received within the bore and includes locking members to releaseably retain the tube. The retainer includes a forward extension to support the seal against fluid pressure. The retainer and seal are configured to be applied to the male member before insertion of the male member into the bore of the connector body. Two of the locking members include ramps extending radially outwardly to contact the body portion defining the entrance opening sequentially prior to contact by the locking arms of the other locking members.

34 Claims, 11 Drawing Sheets

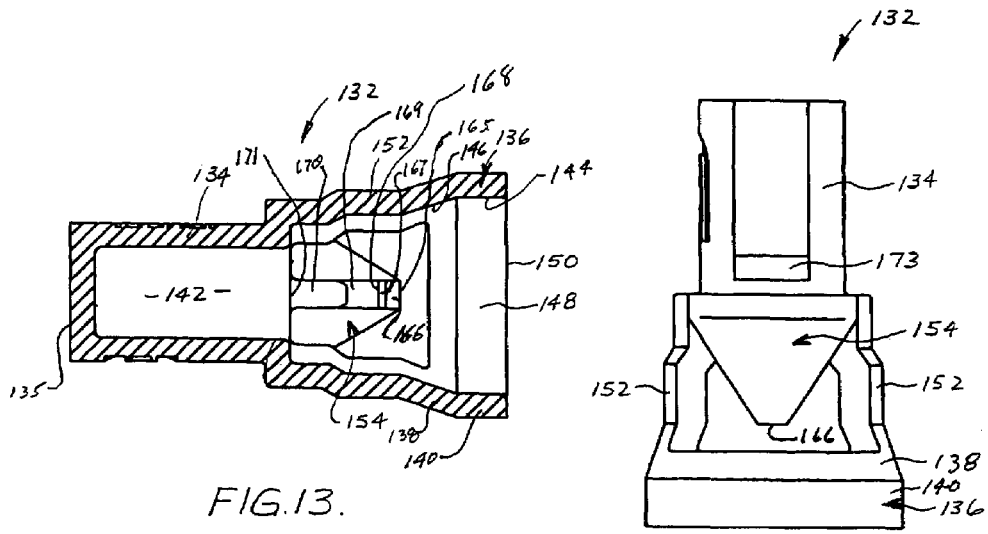
FIG.13.
FIG.12.
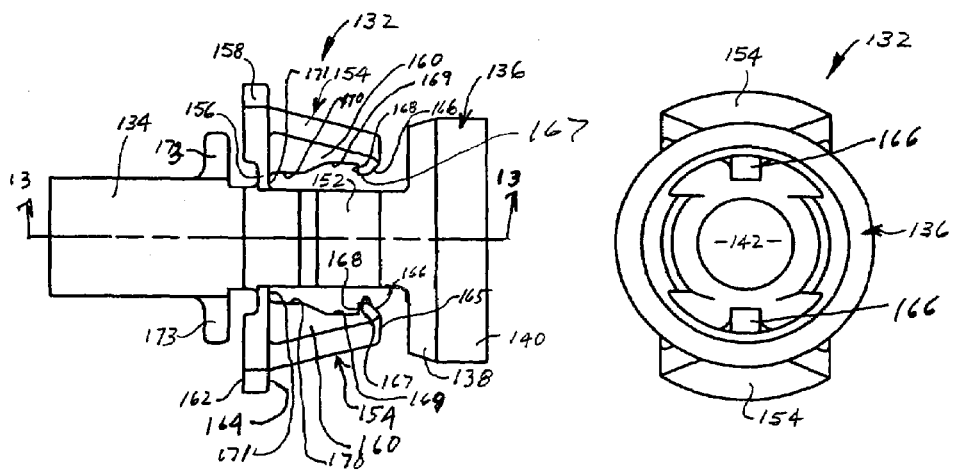
FIG.10.
FIG.11.

QUICK CONNECTOR

This application is a continuation-in-part of application for U.S. patent Ser. No. 11/039,541 filed Jan. 19, 2005 now U.S. Pat. No. 7,344,166 which is a continuation-in-part of application for U.S. patent Ser. No. 10/774,290 filed Feb. 5, 2004, the disclosures of which are hereby incorporated by reference herein.

BACKGROUND OF THE INVENTION

This application relates to coupling assemblies, and more particularly to a quick connector assembly for releasably connecting a male member formed at the end of a tube within a hollow female connector body.

In the automotive, and other fields, one type of coupling assembly often utilized to provide a fluid connection between two components or conduits is a quick connector, which generally includes a male member received and retained in a female connector body. Use of a quick connector is advantageous in that a sealed and secure fluid line may be established with minimum amount of time and expense.

A retainer is used to secure the male member within the connector body. One type of retainer includes a plurality of locking members having locking arms which extend between a radially enlarged upset formed on the male member and an annular face defined in the connector body. The abutment of the locking arms with the upset of the male member at one end and the annular face of the connector body at the other end prevents the withdrawal of the male member from the connector body. This type of retainer is prevalent in the art and has proven effective in many fluid line applications. Examples are disclosed in U.S. Pat. Nos. 5,161,832; 5,324,082; 5,626,371; and 5,628,531.

Retainers of the type discussed above usually include a body in the form of an annular ring to which the locking members are integrally molded. Assembly of this type of retainer typically involves inserting the retainer into a bore defined in the connector body. During the insertion step, the locking members and/or the locking arms must flex radially inward relative to the retainer body to allow the locking members to fit through the opening defining the entry into the bore of the connector body.

Evolution of this form of quick connector coupling to higher pressure applications has led to more robust retainer configurations making placement within the bore of the connector body more difficult. This difficulty is further complicated if the retainer is mounted upon its associated male member or tube prior to insertion into the bore of the connector body, a technique now contemplated for some quick connector applications. Such a procedure is expected to permit utilization of quick connectors in applications where the connector body internal configuration resides in a fluid system component such as a power steering pump, brake cylinder or component of an air conditioning system.

In developing quick connectors suitable for such applications, it has been found that because of the limited annular space between the tubular member and the entrance into the bore of the body, radial movement of the locking members is sometimes impeded by contact between adjacent locking members. Application of excessive force in such conditions would damage the locking members and jeopardize the integrity of the retainer and the resultant fluid connection. Hence, the need was recognized to provide a quick connector coupling assembly having a retainer configuration capable of reliable assembly into its associated connector body while mounted upon the associated tube or male member. Such a retainer allows the locking members and/or locking arms to flex sufficiently radially inwardly during the step of inserting the retainer and male member into the connector body and to pass through the entrance opening without compromising the structural integrity of the locking members.

BRIEF DESCRIPTION OF THE DRAWINGS

FIG. 10 is a side view of the protective cap shown in FIG. 9;

FIG. 11 is a front view of the protective cap shown in FIG. 10;

FIG. 12 is a top view of the protective cap shown in FIG. 10;

FIG. 13 is a cross-sectional view of the protective cap taken along line 13-13 of FIG. 10;

DETAILED DESCRIPTION OF THE DRAWINGS

Figure 1:
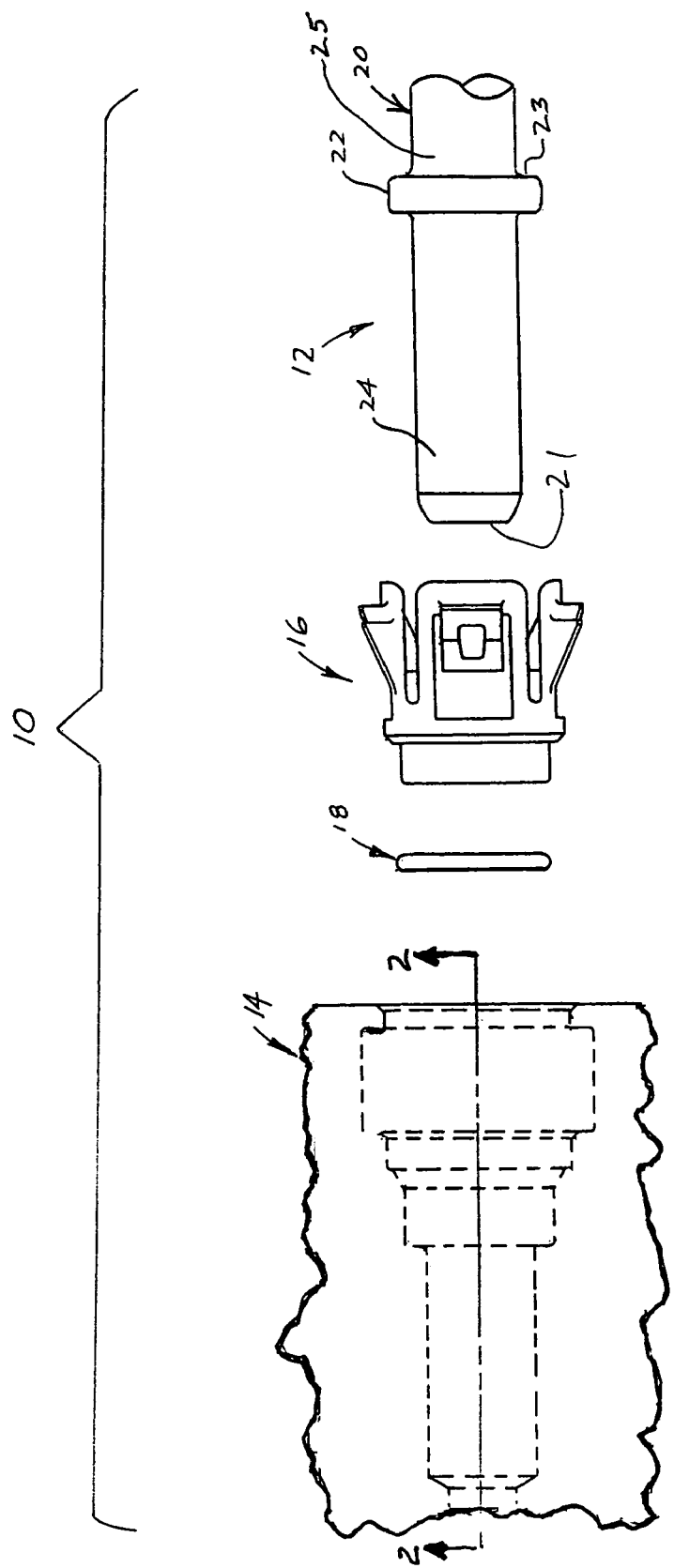
FIG. 1 is an exploded view of a fluid coupling assembly embodying principles of the present invention.

FIG. 1 illustrates a fluid coupling assembly generally designated 10 illustrative of the present invention. The fluid coupling comprises a male member 12, a female connector body 14, a retainer 16 for securing the male member 12 within the connector body 14 and a sealing member 18.

The male member 12 is a hollow, rigid tube 20 having a free end 21. It forms part of a fluid line system. With regard to male member 12, the term forward means toward free end 21 and the term rearward means away from free end 21.

The male member 12 includes a radially enlarged annular upset 22 having a rearward facing surface 23 formed at a distance from the free end 21 of tube 20. The male member 12 also includes a cylindrical portion 24 defined by the outer surface of the tube 20 between the upset 22 and the free end 21. A cylindrical portion 25 also defined by the outer surface of tube 20 continues beyond upset 22. It may be coated with a nylon or other polymeric protective coating. The coating is removed from the cylindrical portion 24 from the free end 21 to the rearward surface 23 of upset 22.

The female connector body 14, as illustrated, can be a component of a power steering system. Other possibilities include a component of a brake system, a transmission oil cooler system, a heating ventilation and air conditioning system, or any other fluid system where a releasable fluid tight connection is desired.

Figure 2:
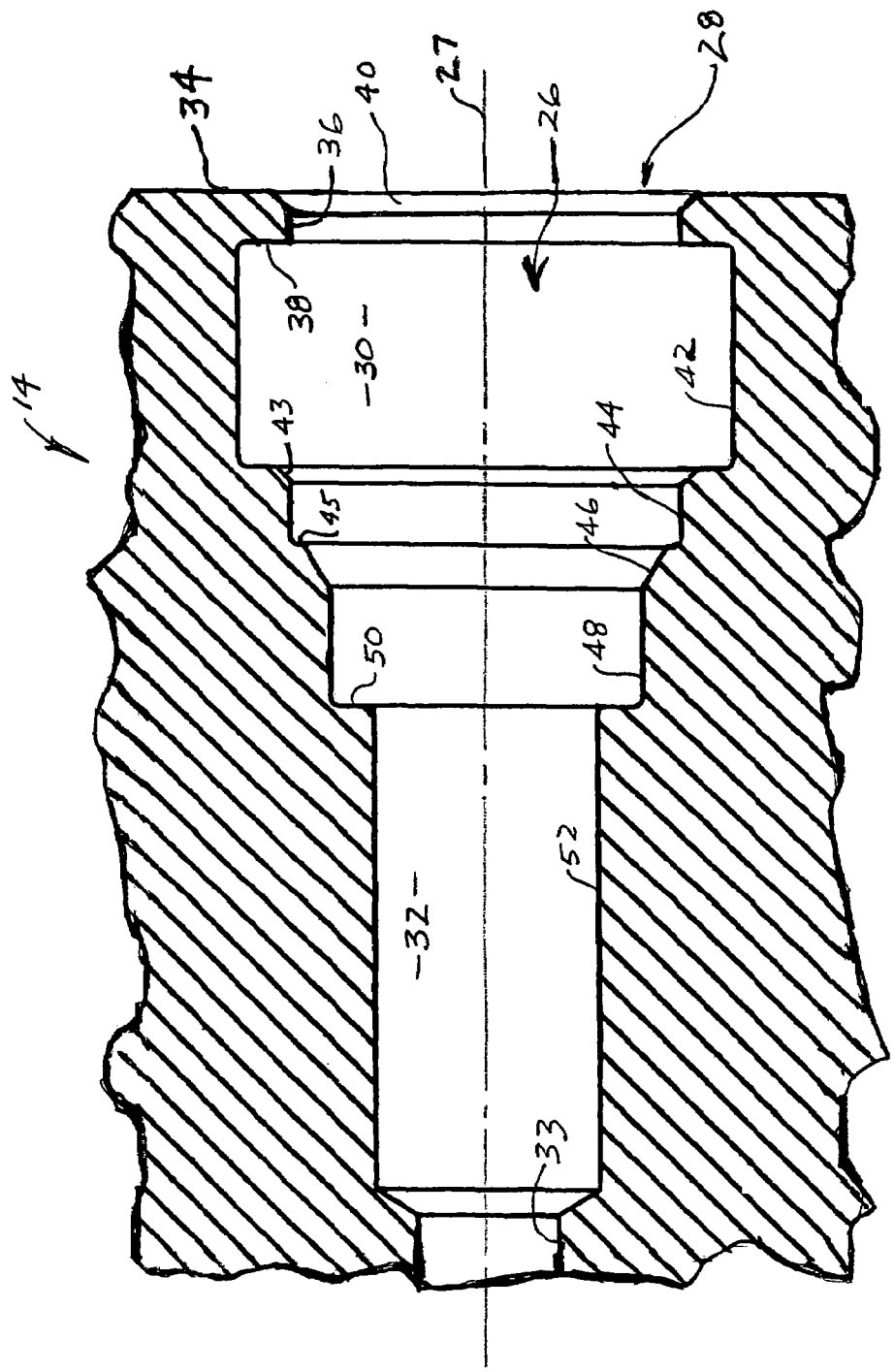
FIG. 2 is a cross-sectional side view of the female connector body taken along line 2-2, of FIG. 1.
Figure 3:
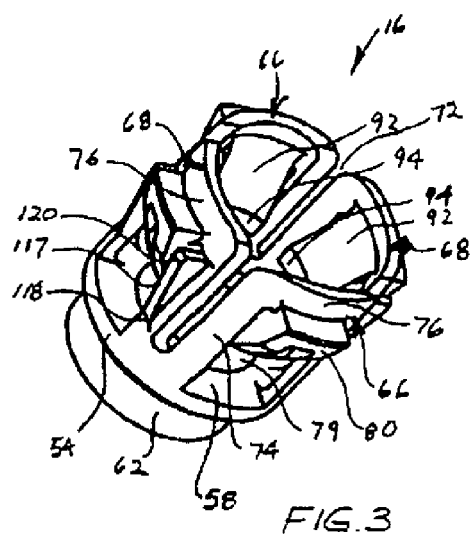
FIG. 3 is a perspective view of the retainer of the coupling assembly illustrated in FIG. 1.
Figure 5:
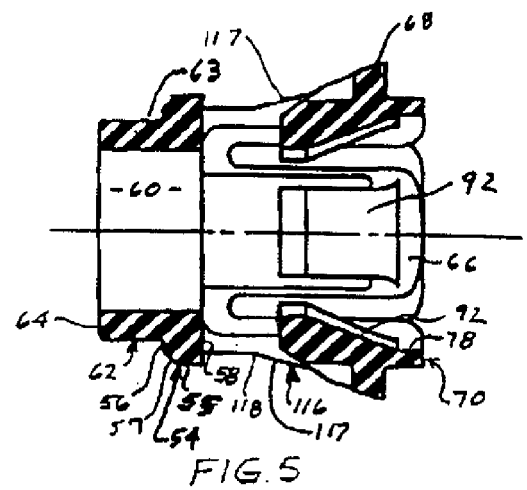
FIG. 5 is a cross-sectional view of the retainer taken along line 5-5 of FIG. 4.
Figure 6:
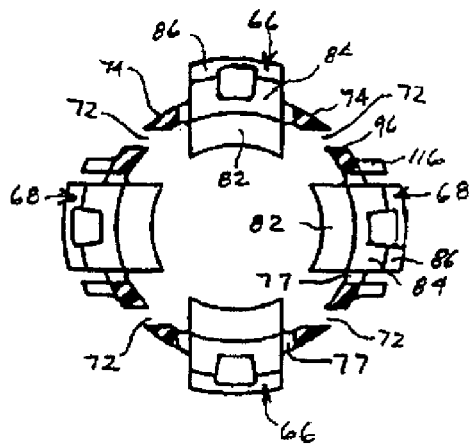
FIG. 6 is a cross-sectional view of the retainer taken along line 6-6 of FIG. 4.
Figure 4:
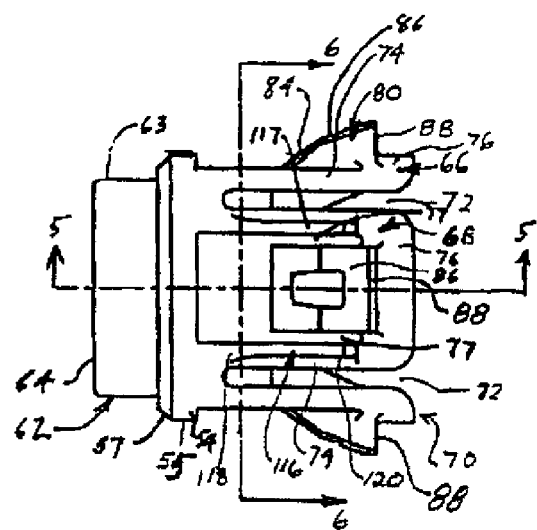
FIG. 4 is a side view of the retainer illustrated in FIG. 3.

As best seen in FIG. 2, the female connector body 14 defines an axial bore 26 extending axially inwardly from an entrance opening generally designated 28 at the intersection of bore 26 and planar wall 34 of body 14. The bore 26 is symmetrical about a centerline 27. The bore 26 is divided into a retainer and sealing member receiving portion 30 and a tube guide portion 32. Coaxial passage 33 continues from tube guide portion 32 into the interior of the body component 14.

With regard to connector body 14 the term forward means toward passage 33 from entrance opening 28 and the term rearward means toward entrance opening 28 from passage 33. The term inner or inward means radially toward the centerline 27 and outer or outward means radially away from centerline 27.

Entrance opening 28 is defined by an axial cylindrical surface 36 through which the retainer 16 and male member 12 to be placed within bore 26 must pass. Chamfer 40 intersects planar wall 34 of body 14 and axially extending cylindrical surface 36. It facilitates insertion of the retainer 16 into the connector body 14. Forward of axially extending cylindrical surface 36 is annular radial surface 38 within retainer and sealing member receiving portion 30 of bore 26. The annular radial surface 38 serves as an abutment locking surface to retain the retainer within the bore 26 which, in turn, releasably retains the male member 12.

Axially forward of the cylindrical surface 36 is an enlarged diameter cylindrical surface 42 followed by a chamfer 43 to a cylindrical surface 44 having about the same diameter as axial cylindrical surface 36. Cylindrical surface ends with a radial inward annular step 45 followed by a chamfered surface 46 which connects to a cylindrical sealing surface 48 that terminates at an annular radial surface 50. The annular radial surface 38, the enlarged diameter cylindrical surface 42, the chamfer 43, the cylindrical surface 44, the inward radial annular step 45, the chamfered surface 46, the cylindrical seal surface 48, and the annular radial surface 50 define the retainer and sealing member receiving portion 30 of the axial bore 26.

Axially inward from the annular surface 50 is cylindrical surface 52 which defines the male member guide portion 32 of the axial bore 26. It is sized to closely overlie the outer cylindrical portion 24 of the male member 12 to coaxially pilot the male member 12 within bore 26.

The retainer component 16 is illustrated in FIGS. 3-6. The retainer 16 is a generally annular element adapted to be coaxially disposed in bore 26 in retainer and seal member receiving portion 30. It includes a body portion in the form of an annular ring 54 having a forward facing radial surface 56 and a rearward facing radial surface 58. With regard to retainer 16, the terms forward and rearward have the same meaning as those terms have with reference to the connector body 14. That is, with the retainer 16 installed in the bore 26 of body 14, forward facing surface 56 faces toward the passage 33, and rearward facing surface 58 faces toward entrance opening 28. Similarly, the terms inner and outer have the same meaning as those terms are used in relation to connector body 14, bore 26, and centerline 27.

The ring 54 of retainer 16 has an outer cylindrical surface 55 sized to fit within cylindrical surface 44 of bore 26. A chamfer 57 is arranged to face chamfer 46 in bore 26 when the retainer is positioned in bore 26.

An annular extension 62 extends axially forward from the ring 54. The outer cylindrical surface 63 of extension 62 is sized to fit in closely spaced piloting relation with cylindrical sealing surface 48. The extension 62 has a forward radial annular surface 64. When the retainer 16 is assembled into bore 26 of connector body 14, the annular extension 62 resides in the portion defined by cylindrical seal surface 48 and cooperates to provide a fluid tight seal with seal 18.

A bore 60 is defined in the ring 54 and extension 62. It is sized to surround the cylindrical portion 24 of tube 20 defining male member 12.

The illustrated retainer 16 includes two first locking members 66 and two second locking members 68. The locking members 66 and the locking members 68 extend axially rearward away from the annular ring 54. Locking members 66 and locking members 68 are similarly configured with the exception that locking members 68 include deflection surfaces defined on ramps 116 discussed in detail below. Like members 66 and like members 68 are diametrically opposed from each other and thus define a pattern of alternate locking members 66 and locking members 68. The purpose for alternating between locking members 66 and locking members 68 with ramp 116 is described below.

The locking members 66 and 68 are cantilevered from ring 54 and extend axially from rearward facing surface 58. An axially extending elongated slot 72 is defined between each adjacent locking member 66 and 68. The slots 72 provide a space to accommodate locking members 66 and 68 as these elements flex radially inward during assembly into bore 26 of body 14. The first ramped outer surface 84 and second ramped outer surface 86 define a discontinuous generally conical outer extent of the locking arms 80 that diverges from the front abutment surface 82 to the rear abutment surface 88.

Each locking member 66 and 68 includes two relatively thin, axially elongated columns 74 extending from rearward facing radial surface 58 of annular ring 54. These columns flex to permit movement of the locking members 66 and 68 radially inward when the retainer 16 is assembled onto the male member 12.

Columns 74 of each locking member 66 and 68 are connected by a rear connecting beam 76 that defines a rear axial end 70 of each locking member. The connecting beams 76 have an outer surface formed on about the same diameter as the axial cylindrical surface 36 of bore 26. The connecting beams also have an inner curved surface 78 that is formed on a diameter larger than retainer bore 60 thereby providing a spaced relationship to cylindrical portion 25 of tube 20 to permit connecting beams 76 to move radially inward toward surface 25 during assembly.

The two columns 74, the ring 54, and the rear connecting beam 76 of each locking member 66 and 68 define a window 79. Each locking member 66 and 68 further includes a duckbill shaped locking arm 80 extending axially forward in window 79 from the connecting beam 76 between the two columns 74. The duck bill shaped locking arms 80 are separated from columns 74 by slots 77. Thus each locking arm 80 is connected to the locking member 66 or 68 at the connecting beam 76. This relationship permits relative movement or flexing of locking arms 80 at the connection to the rear connecting beams 76 during insertion of the retainer 14 through the entrance opening 28 when mounted on male member 12. The relatively long and thin columns 74 also provide necessary flexibility to permit insertion through the entrance opening 28.

Each locking arm 80 has a front abutment surface 82 at its forward end, and first ramped outer surface 84, and second ramped outer surface 86, leading to a rear abutment surface 88. Rear abutment surface 88 is located radially outward from the joinder of each locking arm 80 to a rear connecting beam 76.

The locking arms 80 are configured such that with the retainer 16 and male member 12 installed into the body 14, the front abutment surface 82 of each locking arm 80 faces or abuts the rearward facing surface 23 of upset 22 and the rear abutment surface 88 of each locking arm 80 faces or abuts annular radial surface 38 within bore 26 of body 14. The locking arms 80 thus releasably lock the male member 12 within the connector body 14. An inner cylindrical surface 94 of each locking arm 80 extends rearward from front abutment surface 82. It is formed on about the same diameter as the cylindrical portion 25 of tube 20 and rests on outer cylindrical portion 25 of tube 20 rearward of upset 22.

Because of the relative sizes of the radial extent of upset 22 on male member 20 and annular radial surface 38 in body 14, each locking arm 80 defines a discontinuous conical shape that diverges from the rearward end of inner cylindrical surface 94 of each locking arm 80 to the inner surface 78 of associated connecting beam 76. This shape defines a camming or ramp surface 92.

Ramp or camming surfaces 92 are engaged by upset 22 of the male member 12 during assembly of retainer 16 onto male member 12 to cause radially outward movement of the locking arms 80 to permit passage of the upset 22 to a position forward of front abutment surface 82 and rearward of rearward facing radial. surface 58 of ring 54.

The first ramped outer surface 84 and second ramped outer surface 86 of each locking arm 80 serve as a deflection surface and engage entrance chamfer 40 and axial cylindrical surface 36 at entrance opening 28 on insertion of retainer 16 into the bore 26 of connector body 14. Such engagement imparts the requisite radial inward movement or deflection of members 66 and 68 to permit passage through entrance opening 28. The connection of locking arms 80 to rear connecting beams 76, and the axially elongate configuration of columns 74 provide the requisite flexibility to permit the retainer to pass through entrance opening 28 defined by cylindrical surface 36, even when retainer 16 is mounted on male member 12.

The locking members 68, of which there are two, additionally include ramps 116 extending radially outward from the radial outer surface of each column 74. Ramps 116 define a sloped deflection surface 117 extending from a forward end 118 to a rear end 120. The slope is radially outward from forward end 118 to rear end 120. Forward end 118 is located axially forward of the front abutment surface 82 of duckbill shaped locking arm 80. The deflection surfaces 117 are thus positioned axially forward of the first ramped outer surface 84 of locking arms 80. As illustrated, the angle of the deflection surface 117 of ramps 116 relative to a horizontal line such as centerline 27 of the illustrated embodiment is not as steep as the angle of the first ramped outer surface 84 of locking arms 80. As an example, the angle of the deflection surface 117 of ramps 116 may be 15 to 18 degrees to a horizontal line. The angle of the first ramped outer surface 84 may be 35 to 40 degrees and the angle of the second ramped outer surfaces 86 may be 18 to 20 degrees.

On insertion of retainer 16 into entrance opening 28 surfaces 117 on ramps 116 contact chamfer 40 before any portion of the first ramped outer surface 84 or second ramped outer surface 86 on locking arms 80. This contact causes the locking members 68 to move radially inward prior to radial inward movement of the locking members 66. As insertion progresses, the first ramped outer surface of locking arms 80 of locking members 66 contact the chamfer 40 and inward movement of locking member 66 commences. As insertion of the retainer 16 through the entrance opening 28 progresses, the first ramped outer surfaces 84 of both locking members 66 and 68 come in contact with axial cylindrical surface 36. All locking members are then deflected inwardly and followed by contact of the second ramped outer surface 86 of locking arms 80, insertion is completed.

The retainer 16 is preferably molded from a polymeric material having the requisite strength and flexibility. One suitable polymer is polyetheretherketone known as (PEEK). One such material is Victrex PEEK™ 450G available from Victrex USA, Greenville, S.C. A retainer molded from this material posses the requisite strength to maintain the integrity of the fluid coupling under pressure conditions. It also provides the requisite flexibility to permit installation of the retainer 16 mounted on male member 12 into the bore 26 of connector body 14 without damage to the retainer during the assembly process.

Seal 18 is an annular, elastomeric O-ring that provides a fluid tight joint between the cylindrical seal surface 48 and the cylindrical portion 24 of male member 12. The outer diameter of the O-ring 18 is slightly larger than the diameter of the cylindrical seal surface 48 and the inner diameter of O-ring 18 is slightly smaller than the diameter of cylindrical portion 24 of male member 12. When the fluid system is under operating pressure, the O-ring creates a fluid tight seal against these surfaces as well as forward radial annular surface 64 of retainer 16.

Advantageously the quick connector of the present invention permits assembly of the retainer 16, seal 18 and male member 12 into the connector body as a pre-assembled unit. This feature is particularly useful in applications where the connector body shape is formed in a component of a fluid system. Typically, tubing bundles and associated connector components are supplied from one source and the system component from another. Considerable savings of time and cost are achievable when the system components are already installed into the assembly of which they are a part, and the tubes of the tubing bundles are subsequently connected to the component to complete the fluid path. This is a desirable approach, for example, in assembly of automotive vehicles. With this type of arrangement, the need for a separate connector body component defining bore 26 is eliminated, as is an additional fluid joint between that separate connector body component and the fluid system component 16 such as a power steering pump or the like.

In accordance with the present invention, the male member 12, retainer 16 and seal 18 are joined together to form a sub-assembly for later insertion into the bore 26 of a fluid component defining connector body 14. This approach is convenient for situations where, for example, the tube 20 forming a part of the fluid system is provided by a supplier that is different from the manufacturer or supplier of the component defining the connector body 14, and the final assembly takes place at yet another location. Of course, the retainer 16 of the present invention and its associated O-ring seal 18 have advantages in applications where they are first installed into a bore of a connector body component. In this latter regard the extension 62 of retainer 16 and its coaction with sealing O-ring 18 within bore 26 provides an effective arrangement to form a fluid tight seal between connector body 14 and male member 12 regardless of the assembly sequence employed.

To form the sub-assembly, the retainer 16 is positioned upon male member 12 with the upset 22 of tube 20 positioned between front abutment surface 82 of locking arms 80 and rearward facing surface 58 of ring 54. Contact of upset 22 of male member 12 with the inner camming surfaces 92 of the locking arms 80 of the locking members 66 and 68 causes the arms to spread radially outward. Such flexing movement is accommodated by flexure of the elongate columns 74 and the resilience of the retainer material.

Once the upset 22 of male member 12 is disposed in the space between front abutment surfaces 82 of arms 80 and the rearward facing surface 58 of ring 54 of retainer 16, the locking arms 80 spring radially inward. At this position, the upset 22 of the male member 12 is located between, and in abutting relationship with the rearward facing surface 58 of the ring 54 and the front abutment surfaces 82 of the arms 80. The cylindrical surfaces 94 are in closely spaced facing relation to the cylindrical portion 25 of tube 20.

The seal 18 in the form of an O-ring is then positioned immediately adjacent to the radial annular surface 64 of annular extension 62 of the retainer 16 on cylindrical portion 24 of tube 20 to complete the sub-assembly.

The combined elements of male member 12, retainer 16, and O-ring 18 are joined to the connector body 14 to complete a fluid tight and secure coupling. Insertion of male member 12, O-ring 18 and retainer 16 into the connector body 14 necessarily requires that all elements pass through entrance opening 28 defined by cylindrical surface 36. These elements must fit through the annular space defined by the cylindrical portion 24 of tube 20 and the cylindrical surface 36 of bore 26.

Figure 7:
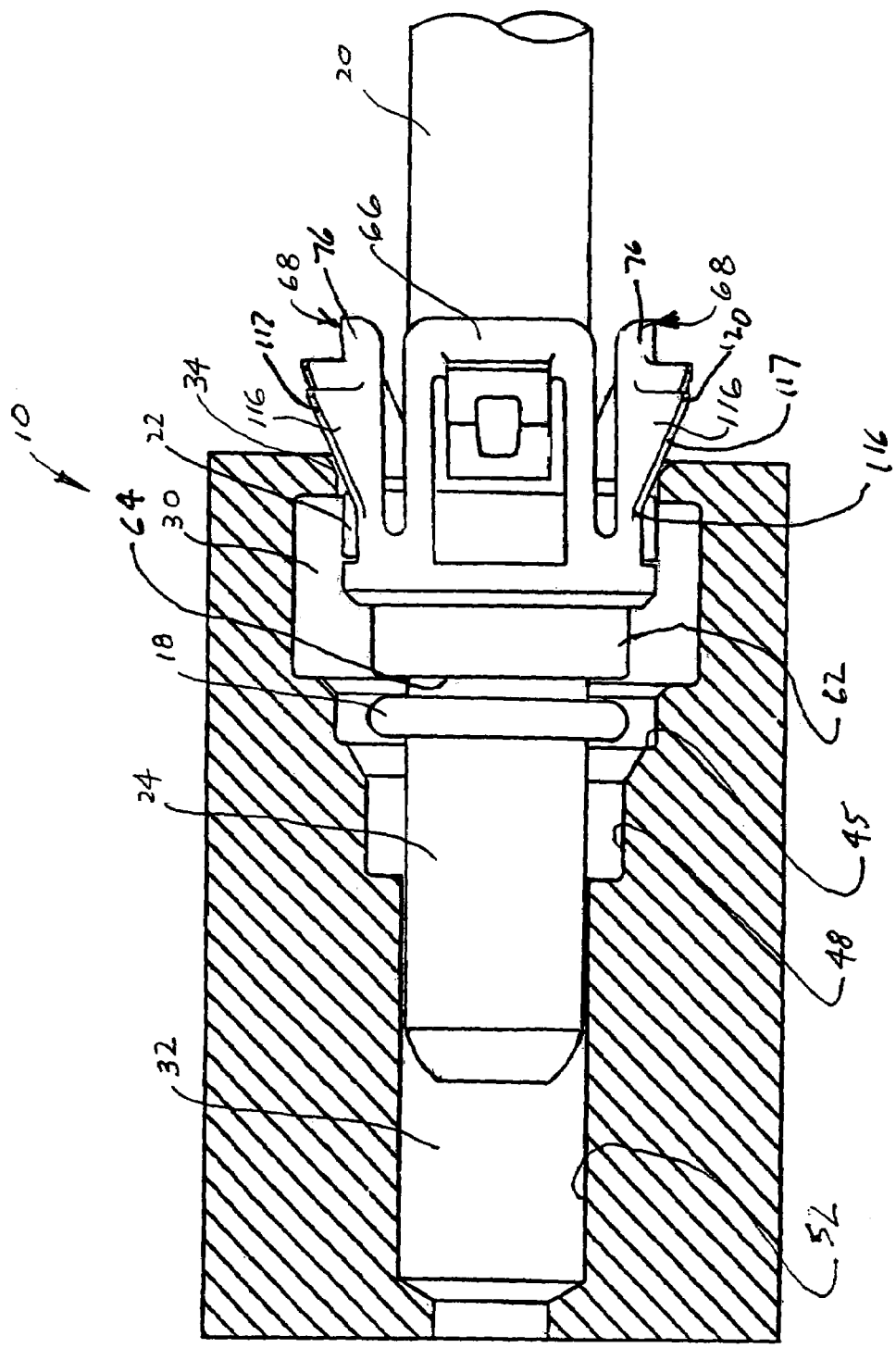
FIG. 7 is a side view, partially in section, of the connector coupling of FIG. 1 in a partially assembled condition.

As illustrated in FIG. 7, the deflection surfaces 117 of ramps 116 of the locking members 68 make initial contact with chamfer 40. The sloped deflection surfaces 117 of ramps 116 of the locking members 68 contact the chamfer 40 prior to the first ramped outer surfaces 84 on locking arms 80 of the locking members 66. Locking members 68 flex radially inward relative to the ring 54 prior to radial inward movement of locking members 66 which is initiated only after first ramped outer surface 84 of locking members 66 contact chamfer 40. The result is a sequential inward flexure of locking members 68 followed by locking members 66. As a result, the rear connecting beams 76 on the locking members 68 move radially inward prior to similar movement by rear connecting beams 76 of locking members 66.

Throughout the insertion process, the inner cylindrical surfaces 94 of locking arms 80 rest upon the cylindrical portion 25 of tube 22. Contact of surfaces 117 of ramps 116 and the ramped outer surfaces 84 and 86 of the locking arms 80 causes the retainer elements to distort or flex in a way to move rear connecting beams 76 inward toward the tube 20 to permit the locking members 66 and 68 to pass through the entrance opening defined by cylindrical surface 36 and cylindrical portion 25 of tube 20 of male member 12. It is thought that multiple flexures occur within the retainer 16. It is thought that the locking arms 80 flex relative to rear connecting beams 76 to accommodate movement of the rear connecting beams 76 toward tube 20. In accomplishing this movement, locking arms 80 pivot about the contact of the inner cylindrical surfaces 94 upon the cylindrical portion 25 of tube 20. It is also thought that flexure occurs in columns 74.

With the male member 12, retainer 16, and O-ring 18 fully inserted into the connector body 14, the locking members 66 and 68 spring radially outward until the outer surfaces of rear connecting beams 76 move to a closely spaced relation with the inner cylindrical surface 36 defining entrance opening 28.

Figure 8:
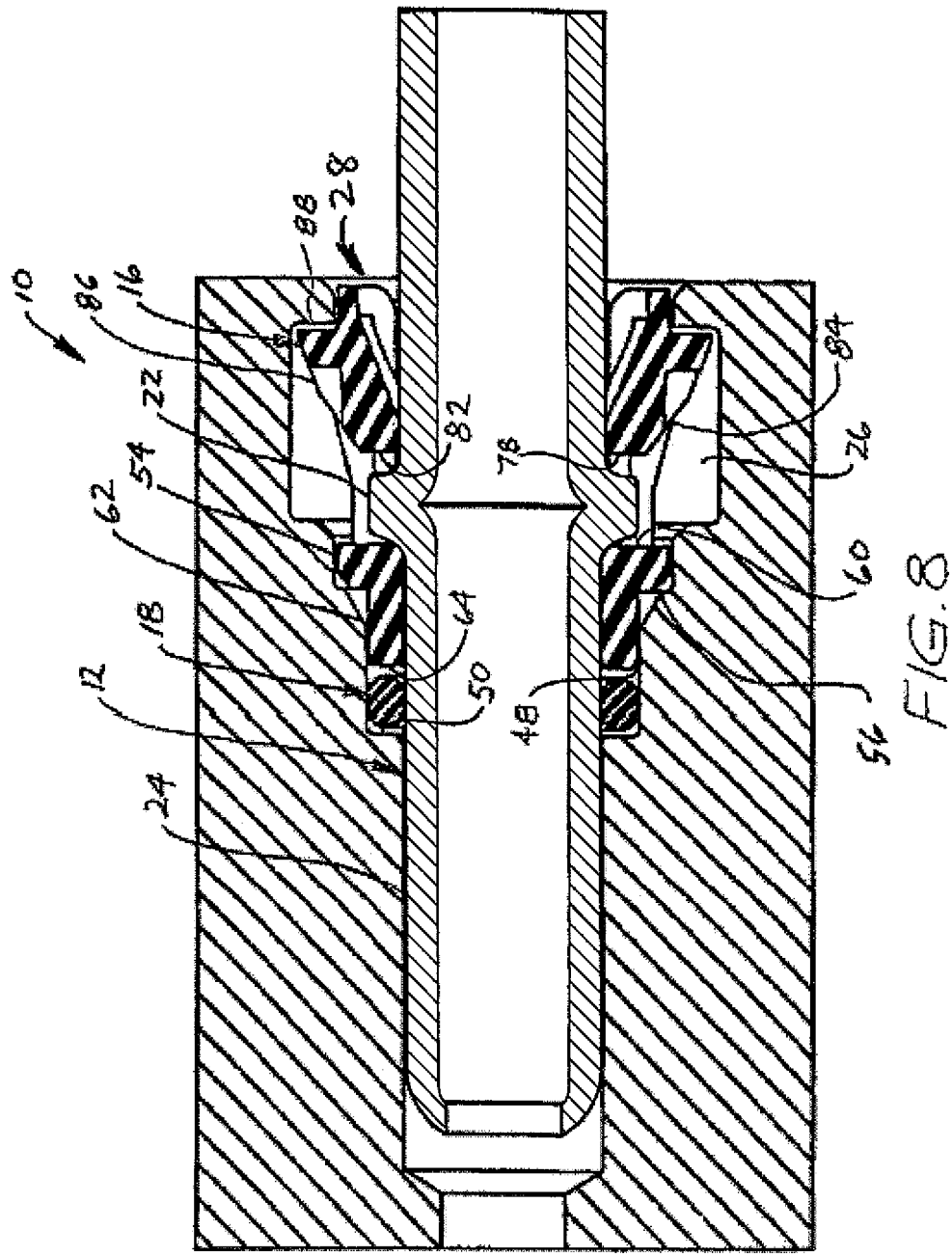
FIG. 8 is a sectional side view of the fluid coupling illustrated in FIG. 1 in a fully assembled condition.

As seen in FIG. 8 in its fully inserted position, the retainer 16 is constrained radially and axially within the connector body 14. The cylindrical extension 62 of the retainer 16 is disposed within the sealing cylindrical surface 48 to pilot the retainer 16 radially within the connector body 14.

Cylindrical surface 55 of annular ring 54 resides in cylindrical surface 44 of bore 26 with radial inward annular step 45 in abutting relation to forward facing radial surface 56 of ring 54. This contact limits further forward movement of the rear abutment surfaces 88 of the locking members 66 and 68 which abut with the annular radial surface 38 of body 16 and limits rearward movement of the retainer 16.

With the retainer 16 constrained in the bore 26 of the connector body 14, the O-ring 18 and the male member 12 are likewise constrained in the bore 26 of connector body 14. The cylindrical portion 24 of the male member 12 is disposed within the inner cylindrical surface 60 of the ring 54 and the extension 62. Moreover, the closely spaced piloting relation between cylindrical portion 24 of tube 20 and cylindrical surface 52 of bore 26 defining male member guide portion 32 pilots the male member 12 relative to bore 26.

Abutment of the rearward facing radial surface 58 of the ring 54 with the forward surface of the upset 22 prevents the male member 12 from further inward movement. Abutment of the rearward surface 23 of the upset 22 with the front abutment surfaces 82 of the locking arms 80 prevents the male member 12 from further rearward movement. Therefore, the male member 12 is constrained radially and axially within the retainer 16, and also within the bore 26 of the connector body 14.

In the installed position, the O-ring 18 is situated in the space defined by the forward radial annular surface 64 of the annular extension 62, the annular radial surface 50 of the axial bore 26, the cylindrical portion 24 of male member 12 and the cylindrical sealing surface 48 of the axial bore 26. As such the O-ring seal is positioned to abut the radial annular surface 64 of annular extension 62 of ring 54. The outer diameter of the O-ring 18 is sized slightly larger than the diameter of the cylindrical sealing surface 48 and the inner diameter is slightly smaller than the cylindrical surface 24 of tube 20. The O-ring 18 is thus compressed radially between the male member 12 and the cylindrical sealing surface 48. Under operating conditions when the fluid system is pressurized, the O-ring is forced to abut against the forward radial annular surface 64 of annular extension 62 urging the retainer rearward. The axial load imparted to the O-ring 18 by fluid pressure is transferred to connector body 14 by the rear abutment surfaces 88 of locking arms 80 acting on the annular radial surface 38 within bore 26. These forces urge the O-ring into sealing contact with the cylindrical sealing surface 48, cylindrical portion 24 of tube 20 and forward radial annular surface 64 of retainer 16 to form a fluid tight seal.

While the above illustrative embodiment employs ramps 116 extending radially outward from the columns 74 of the locking members 68 that define deflection surfaces 117 to assure that the locking members 68 flex radially inward before the locking members 66, it within the scope of the present invention to employ other retainer designs which allow the sequential movement of the locking members. It is contemplated, for example, that only one locking member 68 be provided with ramps 116. Another possible modification is to place a ramp 116 on only one column 74 of each locking member 68. Another example of an alternative design of retainer 16 is to position first ramped outer surface 84 of locking members 68 forward of the first ramped outer surfaces 84 of locking arms 80 of locking member 66. In this approach the forwardly positioned first ramped surfaces 84 of locking members 68 would act as initial deflection surfaces and would similarly cause a sequential radial inward movement of the rear connecting beams 76 of locking members 68 prior to radial inward movement of the rear connecting beams 76 of locking members 66.

Figure 9:
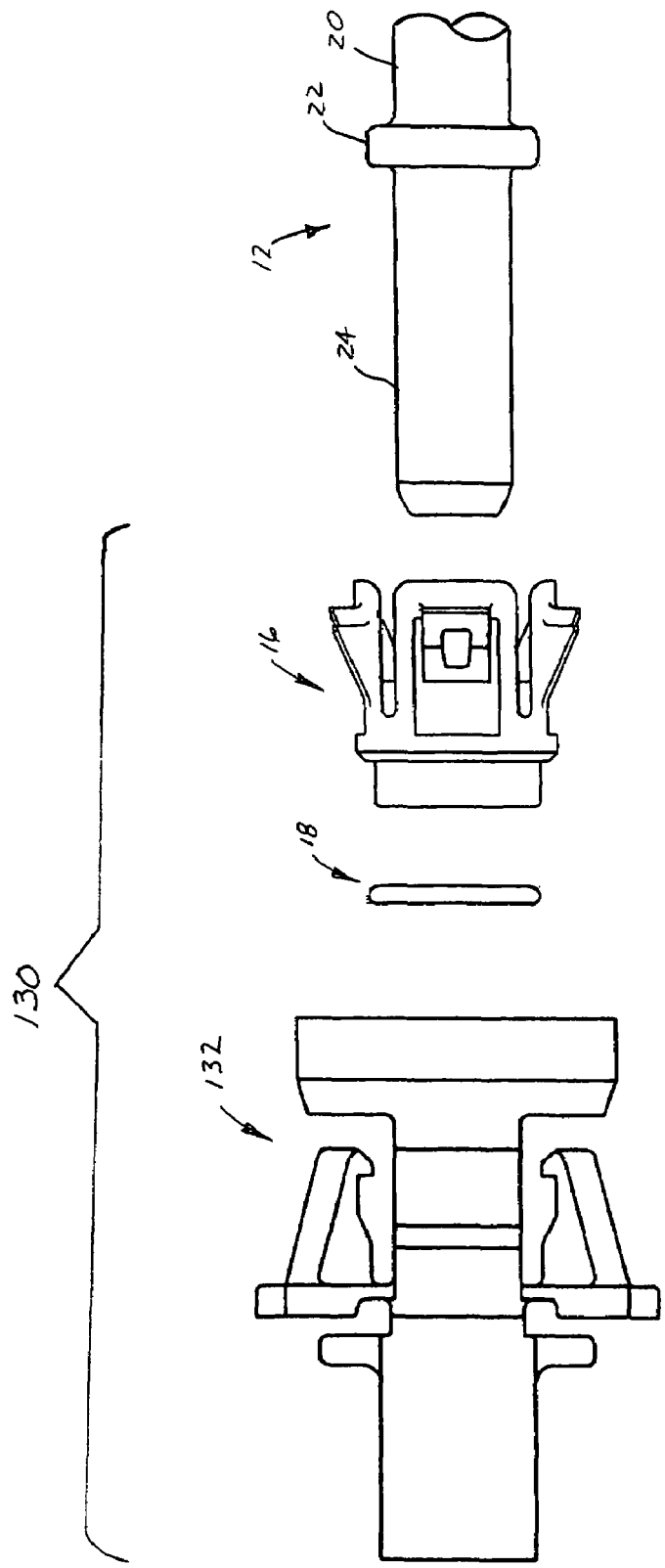
FIG. 9 is an exploded view of a protective cap, and associated seal, and retainer, and male member illustrating principles of the present invention.

Turning now to FIGS. 9 to 17, another aspect of the present invention is illustrated. It is the provision of a protective cap 132 positioned over the retainer 16 and the O-ring 18 to protect these components during shipment to another location for use in the assembly process. FIG. 9 illustrates a connector cap sub-assembly generally designated 130 which comprises protective inner conical surface 146 prevents radial outward movement of the locking members 66 and 68 relative to retainer body ring 54.

Extending radially outward from the axially rearward end of the sleeve 134 are two securement clips 154 located diametrically opposite each other between the columns 152. Each securement clip 154 includes an actuator 158 connected to rearward end of sleeve 134 by a narrowed neck portion 156 that allows the securement clip 154 to flex relative to the remainder of the protective cap 132. Each securement clip 154 has a forward surface 162 and a rearward surface 164.

A hook 160 extends axially rearward from the rearward surface 164 of each actuator 158. The hook 160 tapers from a wide base at its connection to surface 164 to radial end surface 165 at its free end. The hooks 160 are intended to releasably connect a retainer 16 to the protective cap 132.

Each hook 160 includes a tapered abutment surface 166 that extends from radial end surface 165 to an inwardly facing axial surface 167. The tapered surface 166 includes a smooth radius at surface 167 aids in the insertion of O-ring 18 within the space defined by the inward inner surfaces of hooks 160 and columns 152. The tapered surface 166 of each hook 160 is engageable by the chamfer 57 of ring 54 of retainer 16 on attachment of the retainer 16 to the protective cap. Such engagement causes the hooks 160 to flex or pivot about narrowed neck portions 156 so that the ring 54 of retainer 16 can be positioned between the hooks.

Axial surface 167 of each hook is spaced from the inwardly facing axial surface 167 of the other hook 160 a distance that is less than the outer diameter of outer cylindrical surface 55 of annular ring 54 of retainer 16. Forward of surface 167 each hook 160 includes a radial, forward facing attachment surface 168 that extends to an axially extending surface 169. The axially extending surfaces 169 of each hook 160 are spaced apart a distance greater than the diameter of the outer cylindrical surface 55 of annular ring 54 of retainer 16. The hooks are sized to grasp the body ring 54 of retainer 16 within diametrically opposite windows 79 with the attachment surfaces 168 overlying the rearward facing radial surface 58 and the axially extending surfaces 169 overlying the outer cylindrical surface 55.

Each axially extending surface 169 joins a forward tapered surface that converges to forward axially extending surface 170. Surfaces 170 of hooks 160 are spaced apart a distance slightly greater than the diameter of the forward cylindrical extension 62 of retainer 16. Preferably, the surfaces 170 are spaced apart a distance slightly less than the outer diameter of O-ring 18 so as to frictionally retain the O-ring 18. The forward axially extending surfaces 170 meet radial stop surfaces 171 that define the rearward extent of narrowed neck portions 156.

When an O-ring 18 and retainer 16 are disposed within protective cap 132, hooks 160 extend into windows 79 of one of the pairs of locking members 66 or 68. The O-ring 18 resides adjacent radial stop surfaces 171, between the forward axial surfaces 170. The annular extension 62 and ring 54 of retainer 16 reside between the O-ring 18 and the radial forward facing surfaces 168 of the hooks 160 which are in radial facing relation with the rearward facing surface 58 of ring 54. The axially extending surfaces 169 are positioned in closely spaced relation to the outer cylindrical surface 55 of ring 54. Thus, the O-ring 18 and retainer 16 are releasably captured within the protective cap 132.

The axial distance between the radial forward facing surfaces 168 of hooks 160 and the radial stop surfaces 171 at the narrowed neck portion 156 is slightly larger than the combined axial thickness of O-ring 18, the axial extent of forward annular extension 62 and annular ring 54 of retainer 16. The O-ring 18, however, is compressed slightly in the radial direction between the forward axial extending surfaces 170 of hooks 160. The restoring force asserted by the resilient O-ring 18 aids in releasably holding the O-ring in place between the hooks 160 until installed onto male member 12.

Figure 14:
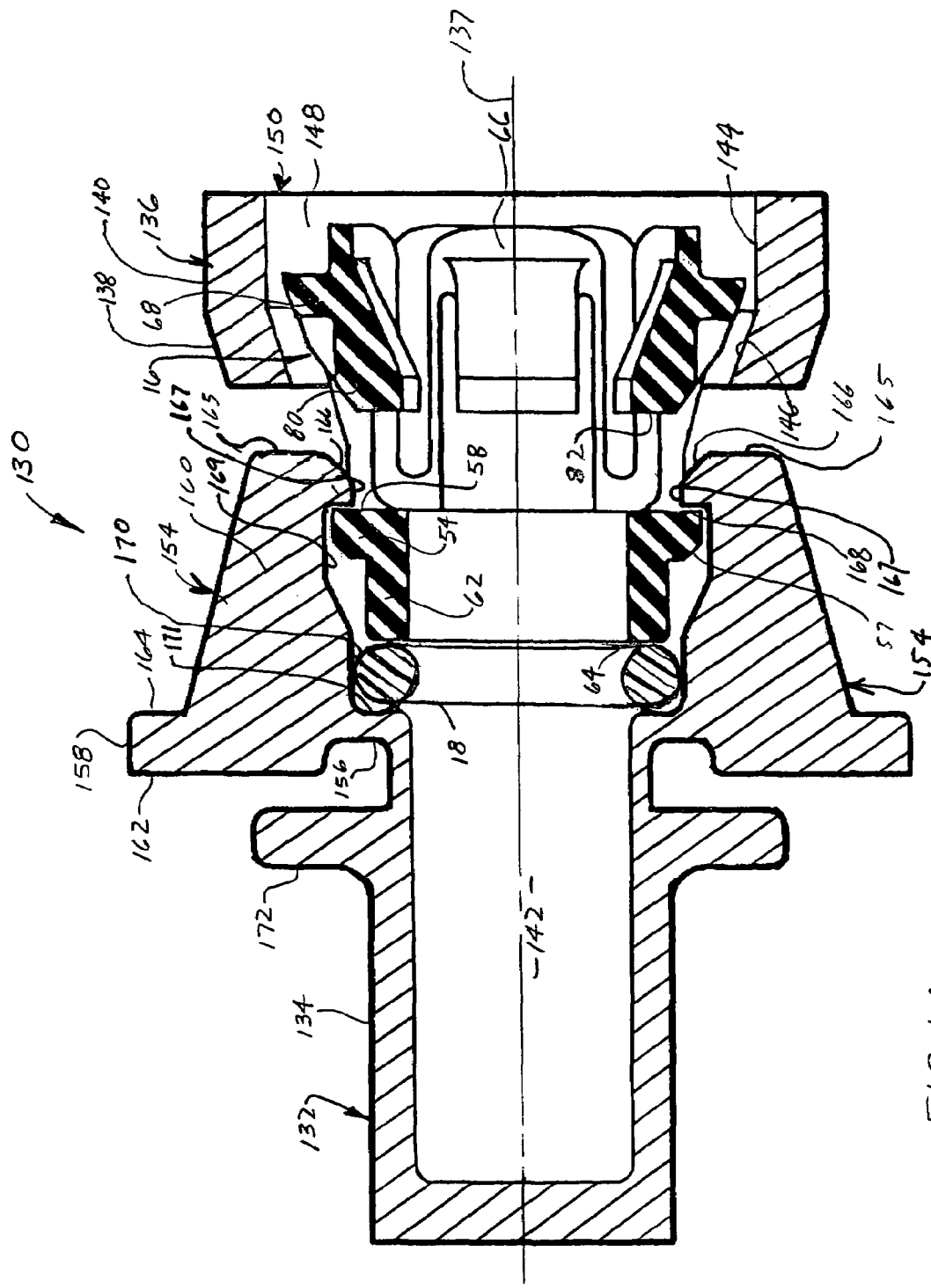
FIG. 14 is a sectional side view of the connector cap of FIGS. 9-13 forming a pre-assembled sub-assembly with the seal and retainer.

The columns 152 are of an axial length such that with the O-ring 18 annular extension 62 and annular ring 54 of retainer 16 captured upon hooks 160 as shown in FIG. 14, the inner conical surface 146 of annular ring 136 is spaced sufficiently from the ramped outer surfaces 84 and 86 of locking arm 80 to permit them to move radially outward on contact of tube upset 22 with inner camming surfaces 92. However, in the absence of an O-ring 18, the protective cap 132 can shift axially relative to retainer 16 sufficiently to place inner conical surface 146 in closely spaced overlying relation to the second ramped outer surfaces 86 of the locking arms 80. In such a position, radial outward movement of the locking arms 80 is precluded, thus preventing insertion of the upset 22 beyond the locking arms 80.

Such shifting can, and does, occur on attempted attachment of the protective cap 132 and retainer 16 to the male member 12 in absence of an O-ring 18. (See FIG. 17). This action prevents completion of the attempted assembly step and indicates the absence of an O-ring 18. In this way, a misassembly without an O-ring 18 is prevented.

The protective cap 132 further includes two radial stops 173 about 180 degrees apart. Each is aligned with one of the securement clips 154. The stops extend radially outward from the outer surface of the sleeve 134 at a distance axially forward of the forward surface 162 of an associated actuator 158. The distance between each actuator 158 and the associated stop 173 is such that it allows the securement clips 154 to pivot to a position such that the hooks 160 are moved radially outward of the outer cylindrical surface 55 of ring portion 54 of retainer 16. Such movement permits removal of the protective cap 132 once the O-ring 18 and retainer 16 are assembled onto a male member 12. The stops 173 prevent the securement clips 154 from being overly flexed which then may cause the necks 156 of the protective cap 132 to fracture.

Removal of protective cap 132 may immediately follow the step of attachment to a male member 12, or may take place later. This step is, however, taken prior to assembly of the male member 12 into a connector body 14.

To form the connector cap sub-assembly 130, an O-ring 18 is inserted through the open end 150 of bore 148 of the ring 136. It is placed between forward axial surfaces 170 of the hooks 166 in the space defined by columns 152 and hooks 160 in abutting relation to the radial stop surfaces 171 at narrowed neck portions 156. The retainer 16 is inserted through the bore 148 of the ring 136 until the chamfer 57 of the retainer 16 abuts the tapered abutment surface 166 of each hook 160. The protective cap 132 and the retainer 16 are aligned, circumferentially, such that axial movement of the cap 132 and retainer 16 causes the free ends of hooks 160 to enter diametrically opposed windows 79 of either locking members 66 or the locking members 68.

Continued insertion of the retainer 16 axially relative to the protective cap 132 causes the chamfer 57 of the body ring 54 of retainer 16 to push against the tapered surface 166 of each hook 160 causing the associated actuator 158 to flex at narrowed neck portion 156. Hooks 160 spread apart at their free ends, permitting ring 54 to pass axial surfaces 167. As illustrated in FIG. 14, once the rearward facing radial surface 58 of ring 54 passes axial surfaces 167, the resilient nature of the polymeric material of the protective cap 132 permits the actuators 158 and hooks 160 to return to a normal unflexed position. The radial forward facing attachment surfaces 168 of hooks 160 capture the rearward facing radial surface 58 of ring 54 to complete the connector cap sub-assembly 130.

In the assembled position, the free end of each hook 160 is located in an associated window 79 of a locking member 66 or 68 on the retainer 16. The radial attachment surface 168 abuts the rearward facing radial surface 58 of ring 54 to prevent the retainer 16 from moving axially rearward relative to the protective cap 132. The O-ring 18 is situated axially forward of the forward radial annular surface 64 of the cylindrical extension 62. The O-ring 18 is retained in the protective cap 132 between the forward annular surface 64 and the radial stop surfaces 171 and between the diametrically opposed forward axial extending surfaces 170.

The connector cap sub-assembly 130, which includes the protective cap 132 with the O-ring 18 and the retainer 16 inserted therein, can be delivered to another location for assembly onto a male member 12. Also, tubes with the connector cap sub-assembly 130 assembled onto a male member 12 may be created for later completion of a fluid tight connection to a body component 14. In each instance, it should be understood that the protective cap 132 is removed from the sub-assembly 130 prior to attachment of the male member 12 to the connector body 14. Such removal is accomplished by flexing the actuators 158 toward the radial stops 173 to spread the hooks 160 apart sufficiently to release the cap 132 from retainer ring 54.

Figure 15:
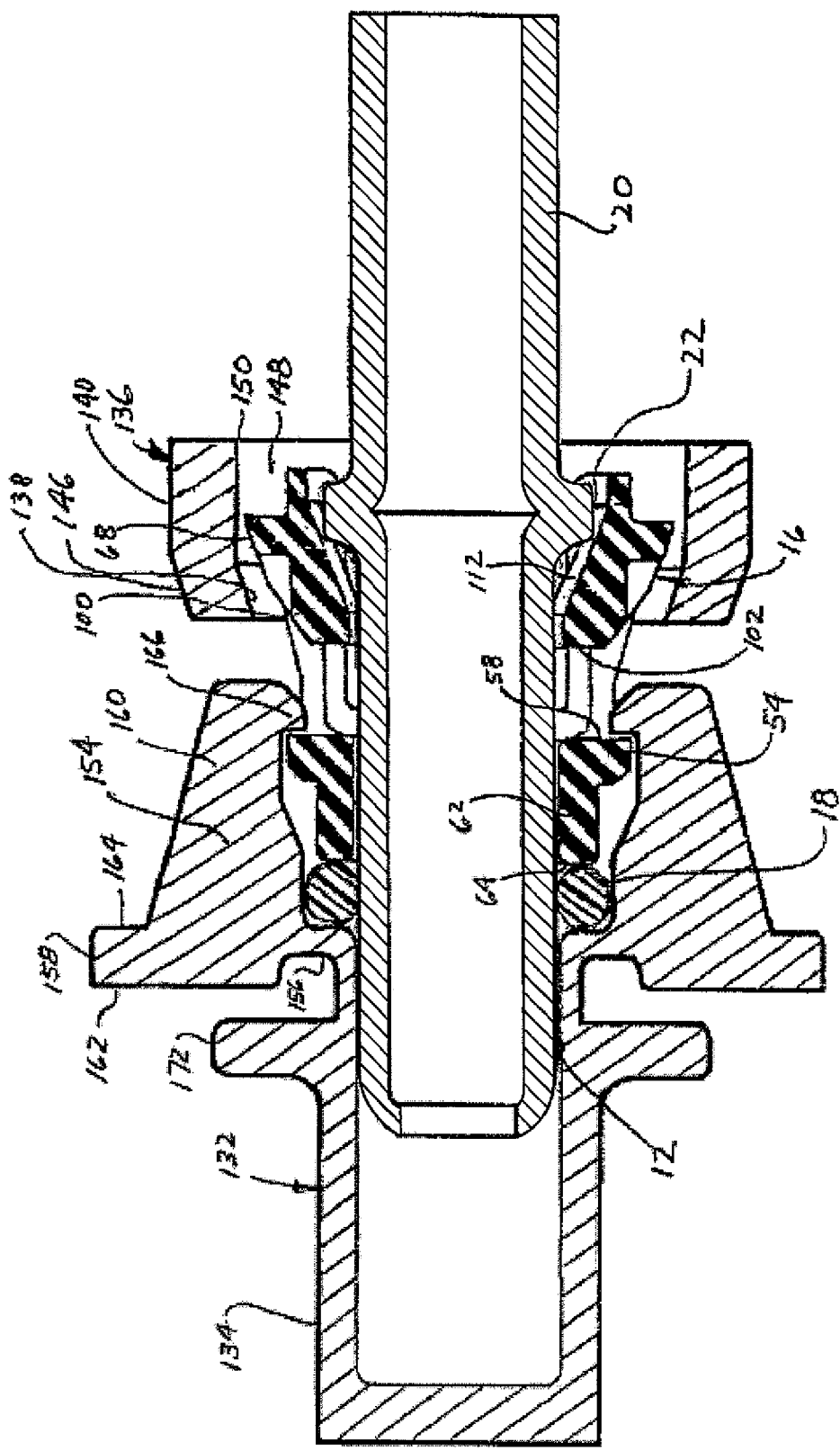
FIG. 15 is a sectional view of the connector cap sub-assembly illustrated in FIG. 14 partially installed upon a male member of a connector coupling assembly.
Figure 16:
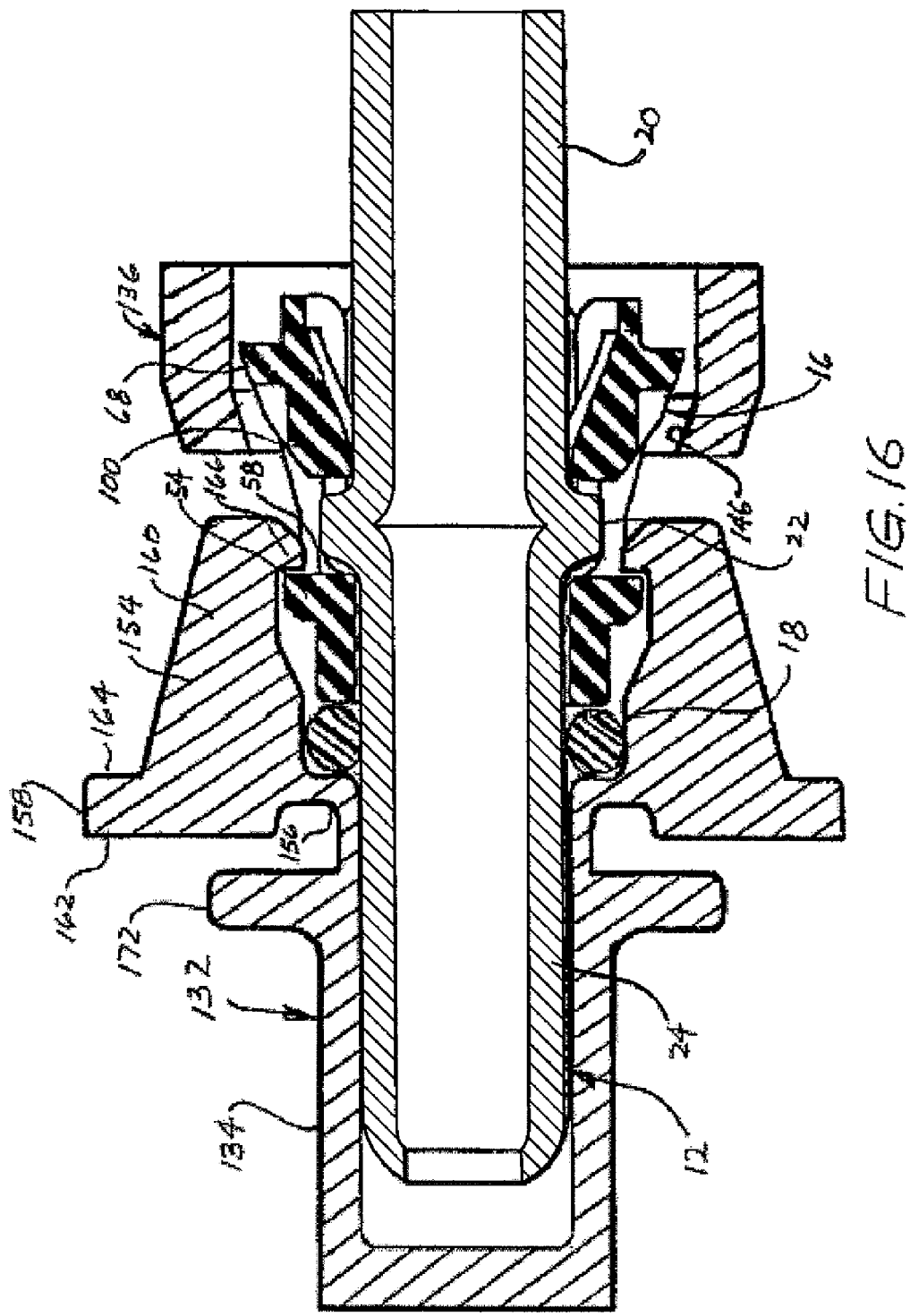
FIG. 16 is a sectional view of the connector cap sub-assembly illustrated in FIG. 14 completely installed upon a male member of a connector coupling assembly.

Referring to FIGS. 15 and 16, the connector cap sub-assembly 130 is attached to a male member 12 by relative axial movement of the cap over the free end 21 of tube 20 until the inner camming surfaces 92 of locking arms 80 of locking members 66 and 68 of the retainer 16 contact the upset 22 of the male member 12 (see FIG. 15). The diameter of the upset 22 is greater than the diameter defined by the inner cylindrical surfaces 94 of locking arms 80. Axial force from relative axial movement of cap 130 onto tube 20 causes the locking arms 80 of the retainer 16 to spread radially outward. Once the arms 80 have surpassed the upset 22 of the male member 12, the arms 80 spring radially inward to an assembled position as illustrated in FIG. 16. At this assembled position, the upset 22 of the male member 12 is located between, and in abutting relationship with the rearward facing surface 58 of the ring 54 and the front abutment surfaces 82 of the locking arms 80, thus preventing the retainer 16 from sliding axially along the male member 12. The O-ring 18 is also positioned onto cylindrical surface 24 of tube 20 forward of annular extension 62 of ring 54. The size of the inner diameter of the O-ring 18 causes it to grip the surface 24 and remain in place.

Figure 17:
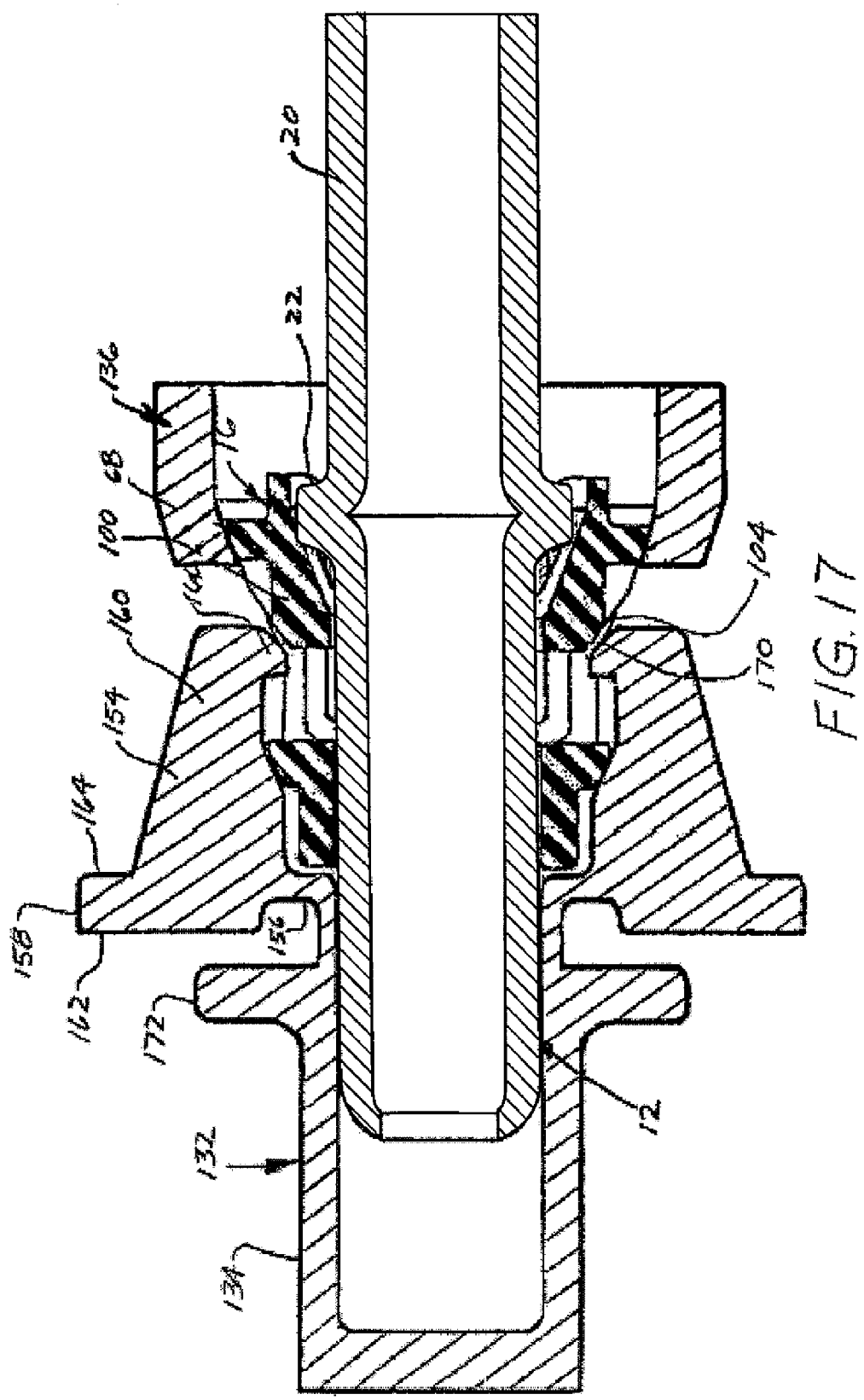
FIG. 17 is a sectional view of the connector cap sub-assembly of FIG. 14 illustrating an abnormal condition.

In accordance with the present invention, the protective cap 132 is arranged to insure that an O-ring 18 is present forward of the retainer 16 within the sub-assembly 130. The connector sub-assembly 130 must include O-ring 18 in order to assemble it onto the male member 12. If the O-ring 18 is not positioned axially forward of the retainer 16, movement of the connector cap sub-assembly 130 axially relative to the male member 12, causes the cap 132 to move axially relative to retainer 16 until inner conical surface 146 of ring 136 closely overlies second ramped outer surface 86 of locking arms 80. Also, tapered abutment surface 166 of each hook 160 moves into a closely spaced abutting relation with the first ramped outer surface 84 of the associated locking arm 80. As previously explained, this relationship between the locking members 66 or 68 and protective cap 132 prevents completion of the assembly of the protective cap 132 and retainer 16 onto tube 20. The condition resulting from the absence of O-ring 18 from subassembly 130 is illustrated in FIG. 17.

To insert the male member 12 into the bore 26 of a connector body 14, the protective cap 132 must be first removed. To remove the protective cap 132, both actuators 158 are pulled toward the stops 173. The securement clips 154 pivot forward causing the hooks 160 to move radially outward. Once the radial surfaces 168 are disposed radially outwardly of the outer cylindrical surface 55 of ring 54 of the retainer 16, the protective cap can be removed by movement axially forward relative to the male member 12. With the protective cap 132 removed, the male member 12 with O-ring 18 and retainer 16 attached can be inserted into the bore 26 of a connector body 14 in the same manner as previously described.

Various features of the present invention have been described with reference to the above illustrative embodiments. It should be understood that modifications may be made without departing from the spirit and scope of the invention as represented by the following claims.

The invention claimed is:

1. A fluid coupling assembly comprising:
    a connector body defining an axially extending tube receiving bore including an axial cylindrical surface defining an entrance opening,
    a retainer axially insertable into said bore of said connector body through said entrance opening, said retainer including a body portion disposed within said bore, and four spaced apart locking members extending rearward from said body portion toward said entrance opening, capable of radially inward deflection on insertion of said retainer through said entrance opening, said locking members each including a rear abutment surface and a front abutment surface disposed radially inward of said rear abutment surface,
    said locking members each defining at least one radially outward facing deflection surface engageable with said axial cylindrical surface defining said entrance opening during insertion of said retainer into said bore, said at least one deflection surface on at least one of said locking members being disposed axially forward, toward said retainer body portion, of said deflection surfaces on at least two other of said locking members and engageable with said axial cylindrical surface defining said entrance opening prior to engagement of said axial cylindrical surface defining said entrance opening prior to engagement of said axial cylindrical surface defining said entrance opening by said at least one deflection surface on said at least two other of said locking members.

2. A fluid coupling assembly as claimed in claim 1 wherein two of said locking members include at least one deflection surface disposed axially forward of said deflection surfaces on the other two of said locking members.

3. A fluid coupling assembly as claimed in claim 1 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking members in abutting relation to said upset and said rear abutment surfaces of said locking members in abutting relation to said annular radial surface of said connector body.

4. A fluid coupling assembly as claimed in claim 1 wherein said assembly includes a seal member and said retainer includes an extension extending forward of said retainer body portion and includes a forward radial annular surface in abutting relation to said seal member.

5. A quick connector coupling assembly as claimed in claim 1 wherein said retainer is molded from a polyetheretherketone polymer.

6. A fluid coupling assembly comprising:
a connector body defining an axially extending tube receiving bore including a surface defining an entrance opening,
a retainer axially insertable into said bore of said connector body through said entrance opening, said retainer including a body portion disposed within said bore, and at least two locking members extending rearward from said body portion toward said entrance opening, said at least two locking members being capable of radially inward deflection on insertion of said retainer though said entrance opening,
said locking members each defining at least one deflection surface engageable with said surface defining said entrance opening during insertion of said retainer into said bore, said at least one deflection surface on one of said at least two locking members being disposed axially forward of said at least one deflection surface on another of said locking members of said at least two locking members toward said retainer body portion and engageable with said entrance opening defining surface nor to engagement of said entrance defining opening surface by said at least one deflection surface on said another of said at least two locking members,
wherein said at least one locking member having said at least one deflection surface disposed axially forward of said at least one deflection surface on another of said at least two locking members includes at least one ramp defining said at least one deflection surface, and
wherein said retainer body portion comprises an annular ring and, said locking members include at least one column extending axially rearward away from said annular ring and wherein said at least one ramp on said at least one locking member is disposed on said at least one column.

7. A fluid coupling assembly as claimed in claim 6 wherein each of said locking members includes a locking arm supported by said at least one column, said locking arms including a front abutment surface, a rear abutment surface, and a ramped outer surface extending therebetween defining a deflection surface of said locking member.

8. A fluid coupling assembly as claimed in claim 7 wherein said at least one deflection surface defined by said at least one ramp is disposed axially forward of said deflection surfaces of said locking arms.

9. A fluid coupling assembly as claimed in claim 8 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking arms in abutting relation to said upset and said rear abutment surfaces of said locking arms in abutting relation to said annular radial surface of said connector body.

10. A fluid coupling assembly as claimed in claim 7 wherein said connector body includes an annular radial surface inward of said entrance opening, and wherein said assembly includes a tubular member with an outer cylindrical portion and an annular upset extending radially outward therefrom, said tubular member is disposed in said bore of said connector body wit said front abutment surfaces of said locking arms in abutting relation to said upset and said rear abutment surfaces of said locking arms in abutting relation to said annular radial surface of said connector body.

11. A fluid coupling assembly as claimed in claim 10 wherein said assembly includes an O-ring seal disposed in said bore of said connector body surrounding said outer cylindrical portion of said tube and wherein said retainer includes an annular extension extending forward of said ring, said annular extension including a forward radial annular surface disposed in abutting relation to said O-ring seal.

12. A fluid coupling assembly as claimed in claim 6 wherein said assembly includes
a tubular male member with an outer cylindrical portion disposed in said bore,
an O-ring seal disposed in said bore in sealing relation to said connector body in said bore and with said outer cylindrical surface of said tubular male member,
said retainer including an annular extension forward of said retainer body portion including a forward radial annular surface disposed in abutting relation to said O-ring.

13. A fluid assembly as claimed in claim 12 wherein said connector body bore includes a cylindrical seal surface surrounding said cylindrical portion of said tubular male member and said O-ring is disposed in sealing relation to said cylindrical seal surface of said connector body.

14. A fluid coupling assembly as claimed in claim 13 wherein said connector body includes an annular radial surface in said bore, wherein said tubular male member includes a radially extending upset on said cylindrical portion and wherein said retainer includes locking arms defining abutment surfaces in abutting relation to said upset and said annular radial surface.

15. A fluid coupling assembly as claimed in claim 6 wherein said at least one locking member including said at least one ramp includes two said columns having a ramp on each said column.

16. A fluid coupling assembly as claimed in claim 15 wherein each of said locking members includes a locking arm supported between said columns, said locking arms including a front abutment surface, a rear abutment surface, and a ramped outer surface extending therebetween defining a deflection surface of said locking member.

17. A fluid coupling assembly as claimed in claim 16 wherein said deflection surfaces defined by said ramps are disposed axially forward of said deflection surfaces of said locking arms.

18. A fluid coupling assembly as claimed in claim 17 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking arms in abutting relation to said upset and said rear abutment surfaces of said locking arms in abutting relation to said annular radial surface of said connector body.

19. A fluid coupling assembly as claimed in claim 16 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking arms in abutting relation to said upset and said rear abutment surfaces of said locking arms in abutting relation to said annular radial surface of said connector body.

20. A fluid coupling assembly as claimed in claim 15 wherein said retainer includes two locking members having a ramp on each said column.

21. A fluid coupling assembly as claimed in claim 20 wherein each of said locking members includes a locking arm supported between said columns, said locking arms including a front abutment surface, a rear abutment surface, and a ramped outer surface extending therebetween defining a deflection surface of said locking member.

22. A fluid coupling assembly as claimed in claim 21 wherein said deflection surfaces defined by said ramps are disposed axially forward of said deflection surfaces of said locking arms.

23. A fluid coupling assembly as claimed in claim 22 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking arms in abutting relation to said upset and said rear abutment surfaces of said locking arms in abutting relation to said annular radial surface of said connector body.

24. A fluid coupling assembly as claimed in claim 21 wherein said connector body includes an annular radial surface inward of said entrance opening, and wherein said assembly includes a tubular member with an outer cylindrical portion and an annular upset extending radiaily outward therefrom, said tubular member is disposed in said bore of said connector body with said front abutment surfaces of said locking arms in abutting relation to said upset and said rear abutment surfaces of said locking arms in abutting relation to said annular radial surface of said connector body.

25. A fluid coupling assembly as claimed in claim 15 wherein said retainer includes four locking members, two of said locking members having a ramp on each said column.

26. A fluid coupling assembly as claimed in claim 25 wherein each of said locking members includes a locking arm supported between said columns, said locking arms including a front abutment surface, a rear abutment surface, and a ramped outer surface extending therebetween defining a deflection surface of said locking member.

27. A fluid coupling assembly as claimed in claim 26 wherein said deflection surfaces defined by said ramps arc disposed axially forward of said deflection surfaces of said locking arms.

28. A fluid coupling assembly as claimed in claim 27 wherein said connector body includes an annular radial surface inward of said entrance opening, and wherein said assembly includes a tubular member with an outer cylindrical portion and an annular upset extending radiaily outward therefrom, said tubular member is disposed in said bore of said connector body with said front abutment surfaces of said locking arms in abutting relation to said upset and said rear abutment surfaces of said locking arms in abutting relation to said annular radial surface of said connector body.

29. A fluid coupling assembly as claimed in claim 26 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking arms in abutting relation to said upset and said rear abutment surfaces of said locking arms in abutting relation to said annular radial surface of said connector body.

30. A fluid coupling assembly as claimed in claim 20 wherein said two locking members having ramps on each column thereof are disposed diametrically opposite each other and said two of said another locking members are disposed diametrically opposite each other between said locking members having said ramps on each of said columns.

31. A fluid coupling assembly as claimed in claim 30 wherein each of said locking members includes a locking arm supported between said columns, said locking arms including a front abutment surface, a rear abutment surface, and a ramped outer surface extending therebetween defining a deflection surface of said locking member.

32. A fluid coupling assembly as claimed in claim 31 wherein said deflection surfaces defined by said ramps are disposed axially forward of said deflection surfaces of said locking arms.

33. A fluid coupling assembly as claimed in claim 31 wherein said connector body includes an annular radial surface inward of said entrance opening, and wherein said assembly includes a tubular member with an outer cylindrical portion and an annular upset extending radially outward therefrom, said tubular member is disposed in said bore of said connector body with said front abutment surfaces of said locking arms in abutting relation to said upset and said rear abutment surfaces of said locking arms in abutting relation to said annular radial surface of said connector body.

34. A fluid coupling assembly as claimed in claim 33 wherein said assembly includes an O-ring seal disposed in said bore of said connector body in surrounding relation to said cylindrical surface of said tube and in sealing relation to said body and wherein said retainer includes an annular extension forward of said retainer body portion having a forward radial annular surface disposed in abutting relation to said O-ring seal, said forward radial annular surface receiving an axial load imparted to said O-ring under fluid pressure conditions.

* * * * *

UNITED STATES PATENT AND TRADEMARK OFFICE
CERTIFICATE OF CORRECTION

PATENT NO.        : 7,467,813 B2
APPLICATION NO.   : 11/174262
DATED             : December 23, 2008
INVENTOR(S)       : Stephen H. Gunderson It is certified that error appears in the above-identified patent and that said Letters Patent is hereby corrected as shown below:

Column 12
Line 46, after "prior to engagement of said axial cylindrical surface defining said entrance opening", delete "prior to engagement of said axial cylindrical surface defining said entrance opening"

Column 13
Line 27, change "nor" to "prior"

Column 14
Line 1, change "wit" to "with"

Column 15
Line 28, change "radiaily" to "radially"

Column 15
Line 44, change "arc" to "are"

Column 15
Line 51, change "radiaily" to "radially"

Signed and Sealed this

Tenth Day of March, 2009

JOHN DOLL
*Acting Director of the United States Patent and Trademark Office*